Oct. 10, 1939.    M. KLAVIK    2,175,528
REAR PART OF AUTOMOBILES WITH REAR ENGINES
Filed Dec. 20, 1938
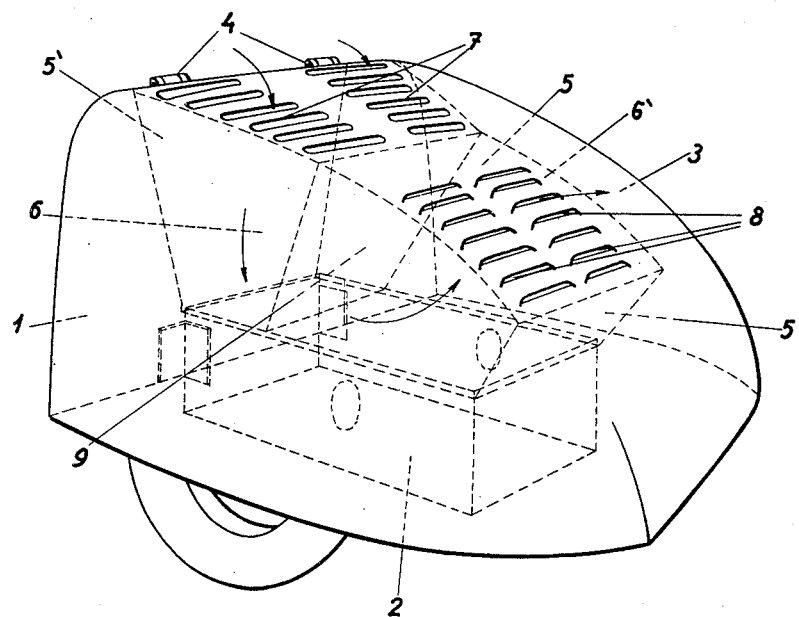

Patented Oct. 10, 1939

2,175,528

UNITED STATES PATENT OFFICE 2,175,528

REAR PART OF AUTOMOBILES WITH REAR ENGINES

Milos Klavik, Prague, Czechoslovakia

Application December 20, 1938, Serial No. 246,914
In Czechoslovakia August 23, 1937

2 Claims. (Cl. 180—54)

The invention relates to a construction of the rear part of a streamlined body for automobiles with rear engine.

The object of this construction of the rear part of streamlined automobile bodies is to secure complete accessibility of the engine and the other parts of the driving unit, with at the same time a considerable saving in space. Heretofore, the rear part of the body has been constructed in the form of a hollow body forming one whole with the rest of the vehicle body and surrounding and protecting the engine, the latter being only partly accessible on lifting the cover. The rear body part thus constructed is always of considerable weight and also renders difficult access to the driving unit.

According to the invention, these disadvantages are eliminated by mounting the engine in a trough-shaped, upwardly open box secured to the back of the passenger compartment, while the rear sheet-metal cover is provided with sides forming a continuation of the sides of the automobile body and extending over the rear wheels. This hinged cover is provided on the inside with walls bearing on the upper edge of the sheet-metal box, so that when the cover is closed, the engine is completely enclosed and protected, while when the cover is opened, it is very accessible.

A constructional example of the invention is shown diagrammatically in perspective in the accompanying drawing.

Secured in a suitable manner to the rear transverse wall 1 of the passenger compartment is the trough-shaped upwardly open box 2 in which is mounted the entire driving unit of the vehicle. The hinged cover 3, the shape of which corresponds to the outer surface of the rear part of the vehicle body, is mounted by means of hinges 4 and is provided on the inside with downwardly directed walls 5, 5' and 6, 6', which, when the cover is closed, bear with their lower edges on the upper edges of the box 2, so that an enclosed space is formed above the engine and the latter is in this way completely protected. This space, confined by the walls 5, 5' and 6, 6', is divided by a further partition 9 extending from the top of the cover, so that the air entering below the cover 3 through the apertures or louvres 7 is supplied to the engine by said partition for cooling, whereupon the air passes to the outside through the apertures or louvres 8 in the cover.

The described construction of the engine cover has the further advantage that at the same time it also protects the back wheels of the vehicle, which thus do not require any wings or protecting plates.

I claim:

1. An automobile with an engine at the rear comprising a cover with hinges thereon forming the rear part of the body and connected by the hinges to the back transverse wall of the carrying compartment, an upwardly open box for the driving unit secured to the transverse wall inside the cover and walls on the inside of said cover which extend downwards to meet the edges of the upwardly open box.

2. An automobile as claimed in claim 1, wherein a partition is arranged within the cover which passes transversely down to the upper edge of the box and divides the space above the driving unit into two parts and sets of louvres in the cover above both spaces, whereby cooling air passes inwardly through one set of louvres and outwardly through the other for cooling the driving unit.

MILOS KLAVIK.